United States Patent [19]
Even

[11] Patent Number: 6,021,131
[45] Date of Patent: Feb. 1, 2000

[54] SORTING NETWORKS HAVING ENHANCED LAYOUT

[75] Inventor: Shimon Even, Watchung, N.J.

[73] Assignee: Lucent Technologies, Inc., Murray Hill, N.J.

[21] Appl. No.: 08/889,632

[22] Filed: Jul. 8, 1997

[51] Int. Cl.[7] .................................................. H04L 12/28
[52] U.S. Cl. ........................ 370/411; 370/389; 370/352; 370/394; 370/397
[58] Field of Search ................................... 370/411, 389, 370/392, 394, 397

[56] References Cited

U.S. PATENT DOCUMENTS 5,636,210   6/1997   Agrawal .................................. 370/411

OTHER PUBLICATIONS

C.D. Thompson, "The VLSI Complexity of Sorting," IEEE Trans. Computers, vol. C32, No. 12, pp. 1171–1184, Dec. 1983.

A Bitonic Sorting Network with Simpler Flip Interconnections, Dec. 14, 1996.

*Primary Examiner*—Douglas W. Olms
*Assistant Examiner*—Ken Vanderpuye

[57] ABSTRACT

Sorting networks having enhanced layouts, and a method for developing such layouts, are disclosed. The improved layouts use 5/4 N grid rows, where N is the number of network inputs. Additionally, up to log (N) permutations of interconnections within the network are combined into a single permutation, thereby reducing grid column requirements for network implementation. The improved layout, as applied to Batcher's bitonic and odd-even networks results in respective upper bound grid-areas of $11.25N^2+o(N^2)$ and $9.375N^2+o(N^2)$ grid units for a network of N inputs.

14 Claims, 9 Drawing Sheets

SORTING NETWORKS HAVING ENHANCED LAYOUT

FIELD OF THE INVENTION

The present invention relates to sorting networks. More particularly, the invention relates to a reduced-area layout for sorting networks.

BACKGROUND OF THE INVENTION

Sorting networks are useful as fast circuits for performing data sorting. Sorting networks consist of input terminals, a plurality of comparison circuits, interconnections or links and output terminals. A comparison circuit is operable to compare two values appearing at its inputs and to route them to respective outputs based on those values. For example, the lesser of the two values may be directed to a predetermined first output and the greater of the two values may be directed to a predetermined second output of the comparison circuit. Sorting networks are useable, for example, in conjunction with parallel processing for computers, and as message routers for sorting messages such as in data and telecommunications networks.

It is desirable to implement sorting networks into an ever-decreasing area within an electrical circuit. Decreasing the comparison circuit count may help in minimizing sorting network layout area. The earliest sorting networks required $(N)^2/2$ comparison circuits, where N is the number of signals to be sorted and routed. That requirement was significantly decreased in a bitonic sorting network attributed to K. Batcher requiring $O(N \log^2 N)$ comparison circuits. See, K. Batcher, "Sorting Networks and their Applications," Proc. AFIPS Spring Joint Computing Conf., vol. 32, pp. 307–314, 1968.

The area required for a sorting network is not, however, necessarily controlled by the number of comparison circuits in the network. An additional important consideration is the area required for the interconnects, e.g., wires or the like, linking the various elements of the sorting network. As such, the physical layout of a sorting network may be of paramount importance in minimizing area requirements.

SUMMARY OF THE INVENTION

Improved layouts for sorting networks having $O[N \log^2 N]$ comparison circuits, and a method for such layouts, are disclosed. The area required for implementing a network can be determined by developing a grid layout for the network. A channel-routing technique is used to develop a grid layout for the indicated interconnect permutations. One such channel-routing technique, useful for illustrating the present method, was developed by R. Pinter. According to Pinter's technique, a maximum of N+1 grid rows are required for interconnecting N outputs to N inputs. A straightforward application of Pinter's method to Batcher's bitonic and odd-even sorting networks results in respective upper bound grid areas of $20.25N^2+o(N)^2$ and $18N^2+o(N)^2$ grid units.

In a layout according to the present invention, 5/4 N grid rows are used to implement a network, where N is the number of network inputs. Additionally, up to log N permutations representing various required interconnection permutations are advantageously combined into a single permutation reducing grid column requirements. Such combination reduces grid column requirements to $9N+o(N)$ for Batcher's bitonic sorting network and $7.5N+o(N)$ for Batcher's odd-even network. The reduced column and row requirements result in an improved layout having an upper bound area of only $11.25N^2+o(N^2)$ grid units for the bitonic network, and $9.375N^2+o(N^2)$ grid units for the odd-even network.

BRIEF DESCRIPTION OF THE DRAWINGS

Further features of the invention will become more apparent from the following detailed description of specific embodiments thereof when read in conjunction with the accompanying drawings, in which.

DETAILED DESCRIPTION OF THE INVENTION

An exemplary sorting network has N input terminals and N output terminals and a plurality of comparison circuits and interconnects or links. If N signals, representing N values, such as, for example, real numbers or address values, are fed into the input terminals, the same signals appear sorted on the output terminals. Sorting networks can be implemented to process electronic, optical or other types of signals. It will be appreciated that the physical implementation of the network will vary depending upon the signal-type being processed, e.g., electronic, optical.

Figure 1:
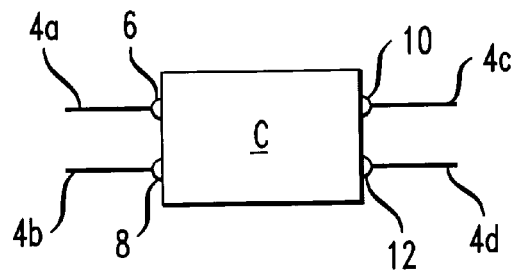
FIG. 1 shows a simplified illustration of a comparison circuit C.

FIG. 1 shows a simplified illustration of a comparison circuit C. A comparison circuit contains logic circuits, memory cells and the like, as described in Weste et al., *Principles of CMOS VLSI Design*, Section 9.4, (Addison-Wesley, 1985). That publication, and all others mentioned in this specification are incorporated by reference herein. A comparison circuit, such as the comparison circuit C, is operable to sort two signals. For clarity and ease of presentation, such signals will hereinafter be referred to as "numbers." Further, as used herein, the term "vector" is defined as a sequence of signals.

The comparison circuit C shown in FIG. 1 has two input terminals 6, 8 and two output terminals 10, 12. If two numbers x, y are fed to the two inputs 6, 8, the same numbers x, y emerge sorted on the output terminals 10, 12. It is assumed herein that the number, say x, having the smaller value emerges upwardly, i.e., on terminal 10 in FIG. 1, and the number, y, having the larger value emerges downwardly, i.e., on terminal 12. To simplify the following description, designations for numbers (signals) delivered to the terminals, and the terminals receiving such numbers, will be used interchangeably.

The networks described herein also have fixed interconnects or links, such as the fixed interconnects 4a–d shown in FIG. 1. Such interconnects are normally implemented, for example, as conductive traces patterned on and throughout integrated circuits, or as optical waveguides in optical circuits. All such interconnects are directed links connecting a network input terminal, not shown, or a comparison circuit output terminal to a comparison circuit input terminal, or a network output terminal, not shown.

It is possible to represent a sorting network by a directed graph, wherein comparison circuits and network terminals are considered to be vertices, and the interconnects or links are directed edges. The following rules and definitions will be used herein with regard to the directed graph representation. First, the vertices of a graph are mapped to grid-points, with no more than one vertex per grid-point. Second, a given edge of the graph is associated with no more than a single routing path, referred to herein as "edge-disjoint" mapping. Two paths may share an intermediate grid-point, but they must cross at that point, i.e., no "knock-knee" or change in direction is allowed. Third, if a vertex is mapped to a grid-point, then all paths representing edges incident on this vertex must begin or end at that grid-point, and no path is allowed to pass through that point.

Figure 4:
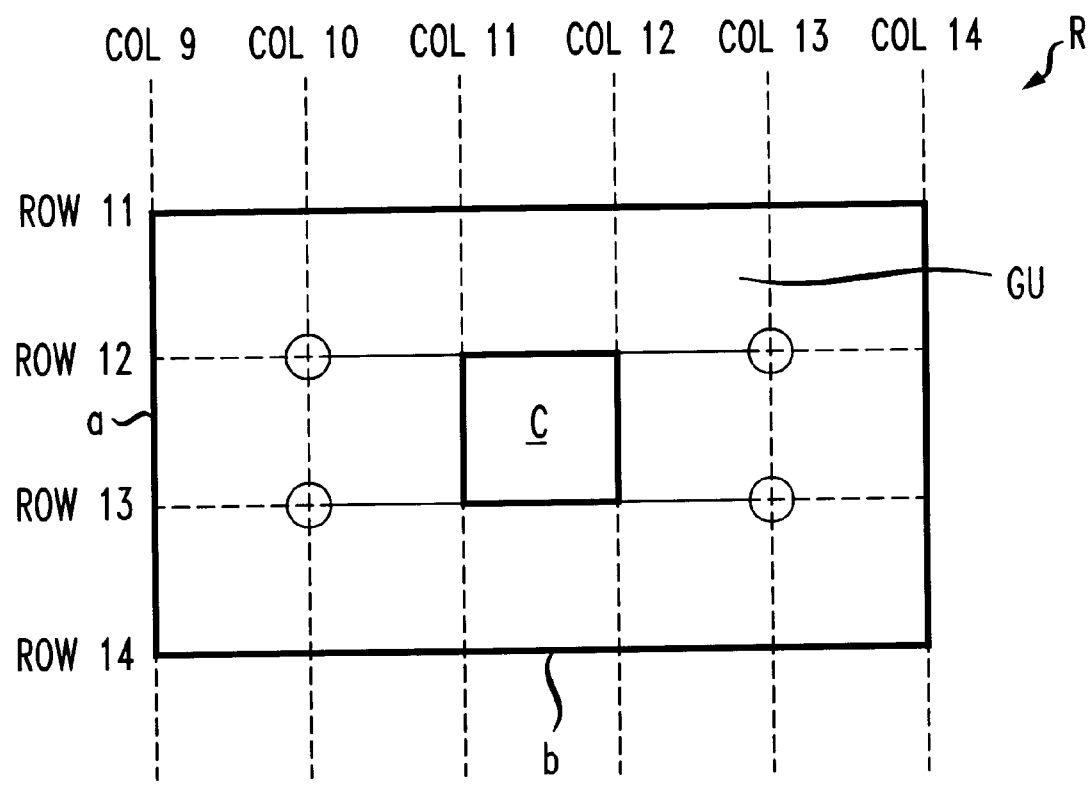
FIG. 4 shows a representation of a single comparison circuit within an exemplary grid.

A "graph" describing a network layout is embedded in a grid. FIG. 4 shows a portion of such a grid suitable for laying out a sorting network. The grid portion shown is defined by grid columns col9–col14 and grid rows row11–row14. The grid columns represent vertical lines in the grid and grid rows represent horizontal lines. Two adjacent grid columns, such as col12 and col13, intersect two adjacent grid rows, such as row11 and row12, defining a grid unit GU. It will be appreciated that grid units are representative of a portion of the area of a grid. For example, the grid area encompassed by a region bounded by grid columns col9–col14 (side a), and grid rows row11–row 14 (side b) is fifteen grid units or GU.

Semiconductor chips are typically laid out in rectangular regions. Thus, the area required for a layout of a sorting network is the area (measured in grid units) of the smallest rectangle that contains such a layout. The grid area of a layout is defined as the least number of grid units in a rectangle that encompasses the layout.

If R is an a×b rectangle, then rectangle R contains at least $[(a-1)\cdot(b-1)]-1$ grid points and at most $(a+1)\cdot(b+1)$ grid points, no matter how the rectangle R is oriented with respect to the grid. Here, a and b are measured in respective vertical and horizontal grid segments, where a vertical grid segment is a line between adjacent grid points within a column and a horizontal grid segment is a line between adjacent grid points within a row. For example, for the rectangle R shown in FIG. 4, a=3 vertical grid segments and b=5 horizontal grid segments, and the number of grid points encompassed by R is $(3+1)\cdot(5+1)=24$. The sides of R need not be parallel to the grid lines and the quantities a and b need not be integers. When a and b are large, the number of grid points is approximately equal to the area of the rectangle in grid units.

It will be appreciated that a grid unit is not arbitrarily small. A grid unit has a minimum size dictated by the state-of-the-art in device fabrication, particularly in terms of minimum feature size, prevailing at any given point in time. For example, assume it is determined that a sorting network requires an area of G grid units. It should be clear that the absolute area, e.g., in square microns, square millimeters, required to implement such a network in, say 1970, is significantly greater than the area required for implementation in 1997. The layout areas presented herein are described in terms of "grid units," which, as it should now be appreciated, is a relative measure of layout area.

Description of a conventional sorting network and its layout is presented in Section I below to facilitate description of the present invention. In Section II, the present invention is described. The present invention is directed to improved layouts of sorting networks having $O[N \log^2 N]$ comparison circuits, such as, for example, Batcher's bitonic and odd-even networks. The notation "O", i.e., big "O", which is a well known mathematical notation, is defined for use herein as follows: a function f(x) is said to be "O(g(x))" if there exists a constant, c, such that for every $x, f(x) \leq c \cdot g(x)$. The notation "o", i.e., little "o", is defined for use herein as follows: a function f(x) is said to be "o(g(x))" if the limit, as x approaches infinity, of f(x)/g(x) is equal to zero. Additionally, the operator "log" as used herein means "$\log_2$," i.e., log base 2.

I. Known Sorting Networks and Routing Methods

The grid-area of a rearrangeable network for N inputs is greater than $\frac{1}{2}(N-1)^2$ grid units. In terms of a directed graph, a network is rearrangeable if for every correspondence of the input terminals to the output terminals there are edge-disjoint directed paths connecting each input terminal with its corresponding output terminal. Every sorting network is rearrangeable.

One known sorting network having $O[N \log^2 N]$ comparison circuits is the bitonic sorting network of K. Batcher. A variation on Batcher's bitonic network, reported by D. E. Knuth, is described below. See, D. E. Knuth, *The Art of Computer Programming, Vol. 3: Sorting and Searching*, Section 5.3.4, (Addison-Wesley, 1973).

For the purposes of the present specification, a real vector is called "bitonic" if it is first nondecreasing and then nonincreasing, or vice versa. For example, the vector [2,5, 7,8,6,4,3,1] is bitonic. A word of zeros and ones is therefore "bitonic" if it is of the form: $0^a 1^b 0^c 1^d$, and either a or d is zero. According to the zero-one principle, if a network sorts all $2^N$ binary input vectors, then it will sort any N-vector of real numbers. As such, for the purposes of clarity, the present description will refer to sorting only zeros and ones. It will be understood, however, that the network applies to any real vector. Moreover, it is assumed for the purposes of illustration that input vectors are equal in size to one another and described by powers of 2, i.e., $N=2^n$. The invention can be utilized, however, if the input vectors are unequal in size and/or are not described as a power of 2.

Figure 2:
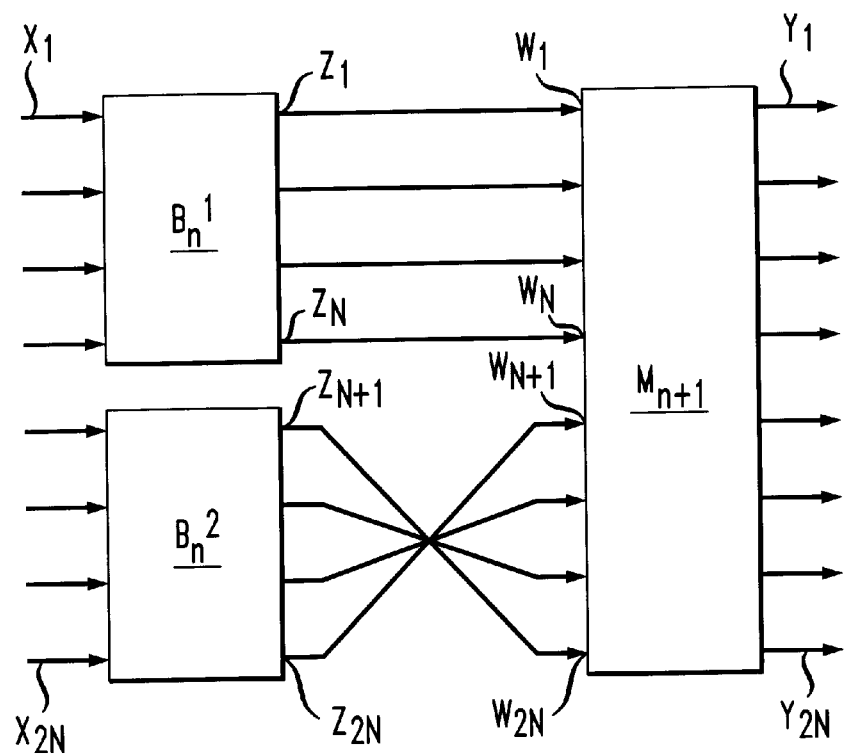
FIG. 2 shows an example of Batcher's bitonic network for sorting.

FIG. 2 shows an example of Batcher's network $B_{n+1}$ for bitonic sorting. The networks described herein have a recursive structure. It will be appreciated by those skilled that explication of such recursive structure is facilitated by examining network construction and related elements in terms of the "n+1st" level.

In the example shown in FIG. 2, the network receives an input vector having 2N arbitrary inputs $x_1, x_2 \ldots x_{2N}$ and generates a sorted output vector having 2N sorted outputs y. The term "arbitrary" is used herein to indicate that the inputs can be in any order, e.g., not sorted, sorted. For the illustration shown in FIG. 2, n=2 and N=4. The arrangement, which is constructed recursively, includes, for $B_{n+1}$, two bitonic sorters and one bitonic merger $M_{n+1}$. The two bitonic sorters include an upper bitonic sorter $B_n^1$ and a lower bitonic sorter $B_n^2$. The bitonic sorters and bitonic merger are constructed of comparison circuits.

Bitonic sorters, such as the upper and lower bitonic sorters $B_n^1$, $B_n^2$, receive at their inputs arbitrary vectors and deliver, at their outputs, sorted vectors. The bitonic merger $M_{n+1}$ sorts bitonic input vectors.

In more detail, the 2N arbitrary inputs $x_1, x_2 \ldots x_{2N}$ are received by the bitonic sorters $B_n^1$, $B_n^2$, N inputs to each. The N sorted outputs $z_1, z_2 \ldots z_N$ of the bitonic sorter $B_n^1$ are delivered, in order, to the first N inputs of the bitonic merger $M_{n+1}$. The N sorted outputs $z_{n+1}, z_{N+2} \ldots z_{2N}$ of the bitonic sorter $B_n^2$ are delivered to the second N inputs of the bitonic merger $M_{n+1}$ in reverse order, i.e., they are "flipped." For example, in FIG. 2, output $z_{N+1}$ of $B_n^2$ is connected to input $w_{2N}$ of $M_{n+1}$, the output $z_{n+2}$ is connected to the input $w_{2N-1}$, etc. Since the output vector from each bitonic sorter, $B_n^1$, $B_n^2$ is sorted, the input vector $w_1, w_2 \ldots w_{2N}$ to the bitonic merger $M_{n+1}$ is therefore bitonic. And since, as indicated above, the bitonic merger $M_{n+1}$ sorts bitonic input vectors, the output vector $y_1, y_2 \ldots y_{2N}$ is sorted.

Figure 3:
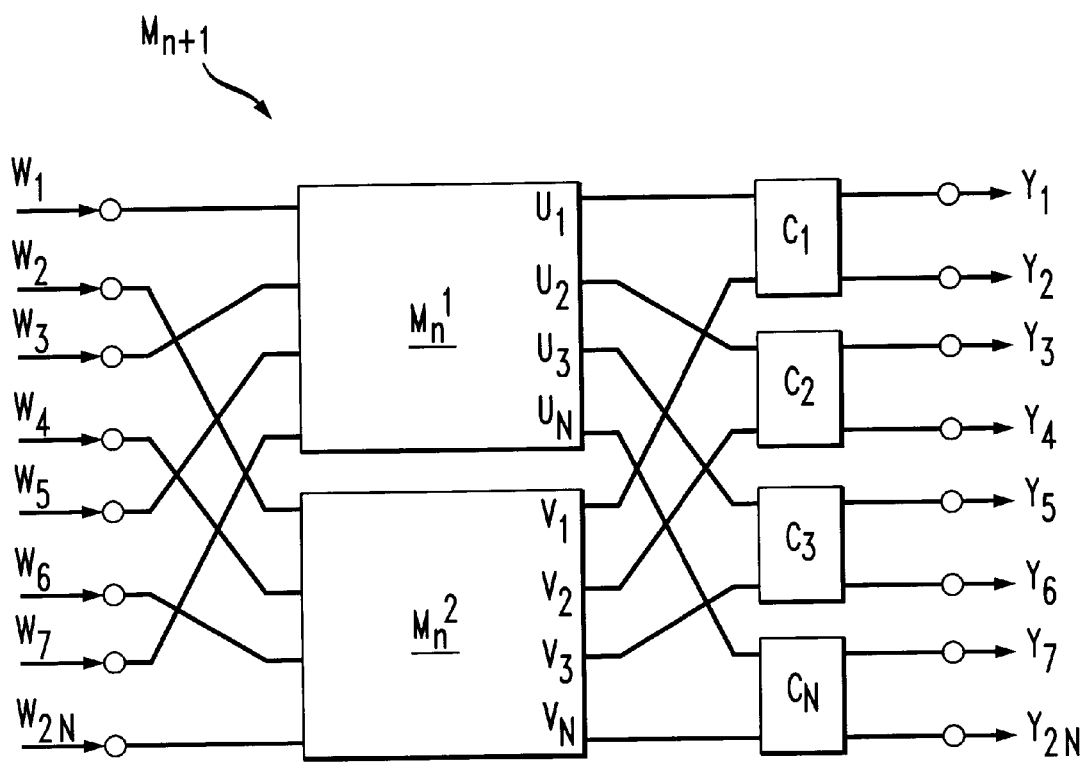
FIG. 3 shows detail of the bitonic merger, $M_{n+1}$.

FIG. 3 shows detail of the bitonic merger, $M_{n+1}$, which is constructed recursively. For consistency with FIG. 2, n=2 and N=4. As described above, the bitonic merger $M_{n+1}$ receives the bitonic input vector $w_1, w_2 \ldots w_{2N}$ and delivers the sorted output vector $y_1, y_2 \ldots y_{2N}$. The bitonic merger $M_{n+1}$ includes two mergers, an upper merger $M_n^1$ and a lower merger $M_n^2$, and N comparison circuits $C_1, C_2 \ldots C_N$.

All odd indexed inputs w are routed to upper merger $M_n^1$. Thus, $w_1, w_3, w_5, \ldots w_{2N-1}$ is the input vector to $M_n^1$. All even indexed inputs w are routed to lower merger $M_n^2$. As such, $w_2, w_4, w_6, \ldots w_{2N}$ is the input vector to $M_n^2$. Each of those "half-size" input vectors is bitonic. Since the mergers $M_n^1$, $M_n^2$ sort bitonic input vectors, output vector $u_1, u_2 \ldots u_N$ from upper merger $M_n^1$ and output vector $v_1, v_2 \ldots v_N$ from lower merger $M_n^2$ are sorted.

For i=1, 2 . . . N, the outputs $u_i$ and $v_i$, are connected to the inputs of the comparison circuits $C_i$, e.g., $u_1$ and $v_1$ are connected to the inputs of $C_1$, and so forth. The outputs of $C_i$ are the outputs $Y_{2i-1}$ and $y_{2i}$ of the bitonic merger $M_{n+1}$.

A channel routing technique can be applied to sorting networks, such as Batcher's bitonic sorter, in order to develop a layout for fabrication purposes and thereby obtain an estimate of network area requirements. One such channel routing technique was developed by R Pinter. See, R. Pinter, "On Routing Two-Point Nets Across a Channel," 19th ACM-IEEE Design Automation Conf., 1982, pp. 894–902. A brief description of Pinter's technique follows. For the following description, it is assumed that there is a first group of N "end-points," i.e., inputs or outputs, aligned in a first column of a square grid. The first group of N end-points is to be connected to a second group of N end-points, similarly aligned on a second column that is to the right of the first column, and uses the same rows. Given a correspondence between the end-points in the first group and the end-points in the second group, grid paths connecting corresponding end-points of each group are constructed. Such paths must run along the grid, using the grid points and edges, and they are allowed to cross each other. They must, however, be edge disjoint, and "knock-knee" is forbidden.

In Pinter's technique, for each cycle of length c of the implied permutation, c+1 grid columns and N+1 grid rows are used for routing the specified cycle. The term "permutation," as used herein, refers to the manner in which a given level within the network is connected to the subsequent network level.

Little detail regarding area requirements has been provided in the prior art. It is known that Batcher's bitonic network can be implemented in an area of $O(N^2 \cdot \log^2 N)$ grid units. Moreover, it has been recognized in the prior art that the term "$\log^2 N$" can be removed from the foregoing expression, leaving $O(N^2)$ grid units as the bound on the grid area for the network. See C. D. Thompson, "The VLSI Complexity of Sorting," IEEE Trans. Computers, Vol. C32, no. 12, pp. 1171–1184, December 1983. Thompson, however, provides insufficient detail about network construction to calculate the constant.

A rigorous application of Pinter's channel routing technique to Batcher's bitonic network results in a layout requiring an area of $20.25N^2 + o(N^2)$ grid units for a network of N inputs. The aforementioned bound, though not explicitly disclosed in the prior art to the inventor's knowledge, would appear to be consistent with Thompson's disclosure. While such a result is an improvement over the known implementation of $O(N^2 \cdot \log^2 N)$ grid units, grid area requirements can be further reduced according to the present invention. Before describing the present innovations for reducing area below $20.25N^2 + o(N^2)$ grid units, the approach for achieving "the $20.25N^2$ implementation," which has not been heretofore disclosed in the prior art, is described below. Using the same analysis, an area of $18N^2 + o(N^2)$ grid units is obtained for Batcher's odd-even network.

The $20.25N^2$ implementation relies on a "straightforward" but rigorous application of Pinter's technique, in conjunction with a savings implicit in the parallel construction of upper and lower mergers $M_n^1$, $M_n^2$. This result is obtained by estimating the required number of grid rows and grid columns as follows.

In the $O(N^2)$ layouts of $B_n$, copies of $M_i$, i<n, are stacked, such as is shown in FIG. 2. Thus, such copies of $B_n$ use the same grid columns when laying out the network. More particularly, there are $2^{n-1}$ copies of $M_i$ stacked. To channel route permutations of $2^i$ interconnections, $2^i + 1$ grid rows are required. Thus, $2^{n-1} \cdot (2^i + 1)$ grid rows are required to channel route the $2^{n-1}$ copies of $M_i$ comprising the network. For i=1, that number of grid rows is maximal, i.e., $2^{n-1}(2+1) = (3/2)N$.

The number of grid columns used in the layout of the merger $M_n$ is denoted by l(n). As shown in FIG. 4, each comparison circuit C occupies one grid unit GU, which is defined by two grid columns, such as the grid columns COL11 and COL12 (not counting the grid columns COL10 and COL13 required for connecting the comparison input and output terminals). As such, two grid columns are required to realize merger $M_1$. Thus, l(1)=2.

According to the recursive definition of the bitonic merger $M_{n+1}$, a permutation of $2N = 2^{n+1}$ incoming lines must be channel routed. Such channel routing uses, at most, $(3/2)2N = 3 \cdot 2^n$ grid columns. As discussed above, $M_{n+1}$ includes two mergers, an upper merger $M_n^1$ and a lower merger $M_n^2$. Each of those mergers requires l(n) grid columns, but, since they are located on top of each other on a grid, one set of l(n) grid columns is sufficient for laying out both mergers. Finally, there is an additional permutation of the 2N lines, which takes less than $3 \cdot 2^n$ grid columns, and a final grid column of N comparison circuits $C_1, \ldots C_N$. Thus, using Pinter's method in conjunction with recognizing the savings implicit in the parallelism of upper and lower mergers gives, for the number of grid columns:

$$l(n+1) \leq 3 \cdot 2^n + l(n) + 3 \cdot 2^n + 2.$$

The solution of the above recursive inequality is:

$$l(n) \leq 6 \cdot 2^n + 2(n) - 12.$$

The number of grid columns in the layout of $B_n$ is denoted $\lambda(n)$. According to the recursive definition of the network as shown in FIG. 2, there is a total of:

$\lambda(n)$ grid columns for laying out copies of $B_n +$ $(3/2)2^n$ grid columns for flipping the links, such as the links $z_{N+1}$ to $z_{2N} +$ $l(n+1)$ grid columns for laying out $M_{n+1}$.

Thus:

$$\lambda(n+1) \leq \lambda(n) + 3 \cdot 2^{n-1} + l(n+1), \text{ or}$$

$$\lambda(n+1) \leq \lambda(n) + 3 \cdot 2^{n-1} + 6 \cdot 2^{n+1} + 2(n+1) - 12, \text{ and}$$

$$\lambda(n+1) \leq \lambda(n) + 27 \cdot 2^{n-1} + 2(n+1) - 12.$$

The solution of the above recursive inequality is:

$$\lambda(n) = (27/2) \cdot 2^n + o(2^n)$$

$$\lambda(n) = (27/2)N + o(N) \text{ grid columns}.$$

Thus, the area for Batcher's bitonic sorting network is:

$$\text{Area} = (3/2)N \times [(27/2)N + o(N)], \text{ or}$$

$$\text{Area} = 20.25 N^2 + o(N^2) \text{ grid units.}$$

II. Improved Network Layouts According to the Present Invention

Taking several additional steps in conjunction with applying Pinter's channel routing method, respective upper bound areas of $11.25N^2 + o(N^2)$ and $9.375N^2 + o(N^2)$ grid units are realized for Batcher's bitonic network and Batcher's odd-even network for N inputs. The invention will be described with reference to Batcher's bitonic network. In mathematical parlance, and as applied to network area requirements, a specified "upper bound," e.g., $11.25N^2 + o(N^2)$ grid units means that the sorting network can be implemented in a minimum area that is less than or equal to $11.25N^2 + o(N^2)$. Thus, in the present context, it is advantageous to reduce an upper bound. It should be appreciated, however, that in other less preferred embodiments of the present invention, Batcher's bitonic sorting network can be implemented in an area greater than $11.25N^2 + o(N^2)$ grid units. This could be accomplished, for example, by not linking comparison circuits as efficiently as possible in accordance with the present teachings.

Figure 5A:
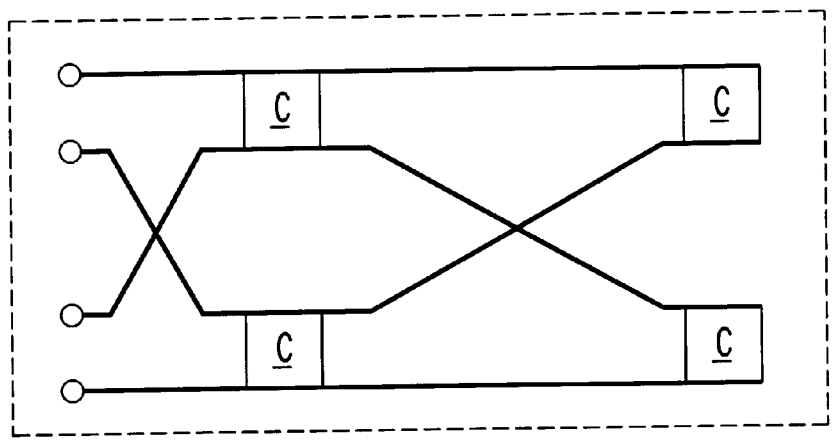
FIG. 5a shows the merger $M_2$.
Figure 5B:
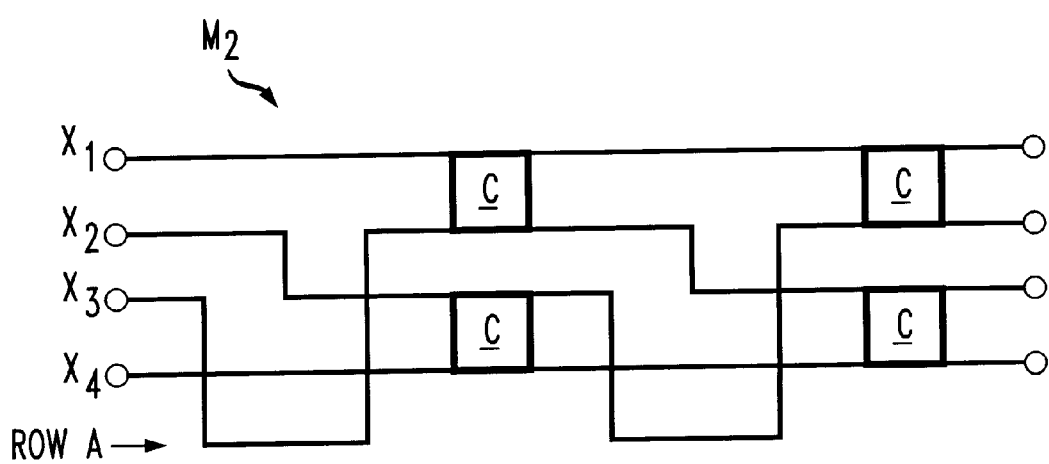
FIG. 5b shows a channel routing according to the present invention wherein the merger $M_2$ of FIG. 5a is laid out using five rows.
Figure 6:
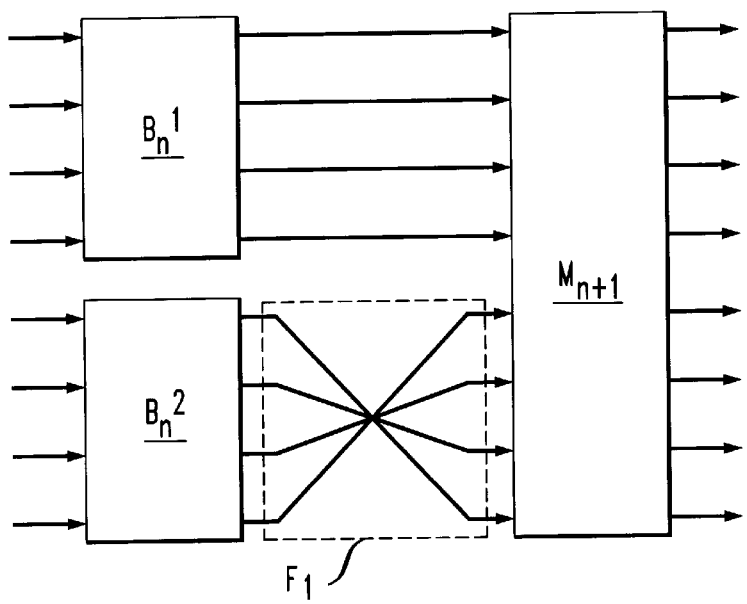
FIG. 6 shows a first permutation wherein outputs of the lower bitonic sorter $B_n^2$ are flipped before entering the bitonic merger $M_{n+1}$.

In one aspect of the present invention, only (5/4)N grid rows are used to layout a bitonic sorter $B_n$ in Batcher's bitonic network, as follows. In the construction of the network, there are stacks of the bitonic merger $M_2$. The structure of $M_2$ is shown in FIG. 5a. As shown in FIG. 5b, the merger $M_2$ can be laid out using five grid rows: one grid row each for four input terminals $x_1, x_2 \ldots x_4$, and one auxiliary grid row designated ROWA. The total number of copies of $M_2$ stacked one above the other in a network of N inputs is N/4. The total number of required grid rows is therefore (5 grid rows/merger $M_2$)×(N/4 mergers $M_2$)=5/4N. Thus, network grid row requirements are reduced from 3/2N to 5/4N by stopping the recursion at $M_2$ rather than $M_1$. No additional row savings are obtained over 5/4N by stopping the recursion at $M_{3+}$.

In a further aspect of an improved sorting network layout, several permutations are combined into a single permutation thereby reducing grid column usage. The aforementioned reduction will be described first mathematically so that grid column usage can be estimated for quantifying grid area. After the mathematical analysis, figures and accompanying description will illustrate, for an exemplary embodiment, the aforementioned combination and resulting channel routing and contrast it with a conventional implementation.

The permutation in the beginning of the layout of $M_n$ has been allotted $3 \cdot 2^{n-1}$ grid columns. The permutation in the beginning of $M_{n+1}$ and the two half-size permutations of the upper merger $M_n^1$ and the lower merger $M_n^2$ can be "joined" into one "new" permutation of $2^{n+1}$ lines, which takes less than $3 \cdot 2^n$ grid columns. Thus, an upper bound on the number of grid columns is given by:

$$l(n+1) \leq 3 \cdot 2^n + l(n) - 3 \cdot 2^{n-1} + 3 \cdot 2^n + 2,$$

therefore:

$$l(n+1) \leq l(n) + 9 \cdot 2^{n-1} + 2.$$

Before solving the above recursion, a basis change is required. Instead of $l(1)=2$, take $l(1)=5$. The reason for the basis change is that $3 \cdot 2^{n-1}$ is substracted in moving from $n=1$ to $n+1=2$. In this case, $3 \cdot 2^{n-1}$ equals 3, yet no three grid columns for channel routing the inputs have been allotted. Solution of the recursion yields, for the upper bound on the number of grid columns:

$$l(n+1) \leq 9 \cdot 2^{n-1} + 2n - 4.$$

Next, the bitonic sorter $B_n$ is laid out using its recursive definition. $B_1$ is identical to $M_1$. Bitonic sorter $B_{n+1}$ includes two sorters, an upper sorter $B_n^1$ and a lower sorter $B_n^2$. The N outputs $z_1, z_2 \ldots z_N$ of the bitonic sorter $B_n^1$ are delivered, in order, to the first N inputs of the bitonic merger $M_{n+1}$. The N outputs $z_{n+1}, z_{n+2} \ldots z_{2N}$ of the bitonic sorter $B_n^2$ are delivered to the second N inputs of the bitonic merger $M_{n+1}$ in reverse order, i.e., they are "flipped".

Additionally, the "flipping" of the N outputs from the bitonic sorter $B_n^2$, see FIG. 2 for example, consumes no area if combined with the other permutations in the beginning of $M_{n+1}$.

So combined, the number of grid columns in $B_{n+1}$, denoted by $\lambda(n+1)$, is:

$$\lambda(n+1) = \lambda(n) + l(n+1).$$

Thus, $$\lambda(n+1) \leq \lambda(n) + 9 \cdot 2^{n-1} + 2n - 4.$$

Using $\lambda(1)=2$:

$$\lambda(n+1) \leq 9 \cdot 2^{n+1} + n(n-3) - 16.$$

Therefore:

$$\lambda(n) \leq 9 \cdot 2^n + (n-1)(n-4) - 16.$$

Thus, in an improved layout according to the present invention, the number of grid rows used for a layout of the bitonic sorting network for $N=2^n$ inputs is 5/4N, while the number of grid columns is bounded by $9N + o(N)$. The grid-area is therefore bounded by $11.25N^2 + o(N^2)$ grid units.

A conventional implementation of the three permutations listed above is described with reference to FIGS. 6–10, for n=3. The aforementioned combination of those three permutations according to the present invention is described with reference to FIG. 11.

Figure 7:
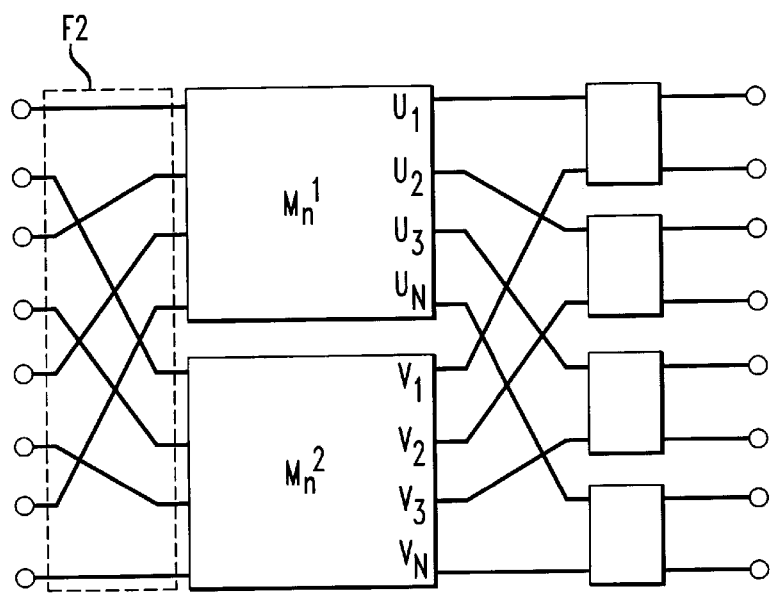
FIG. 7 shows a second permutation that occurs as the output signals of the bitonic sorters shown in FIG. 6 enter the bitonic merger $M_{n+1}$.
Figure 8:
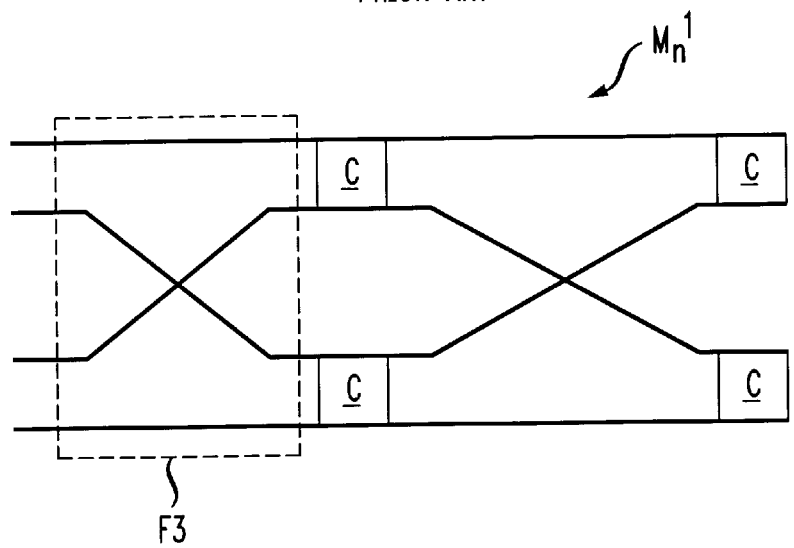
FIG. 8 shows a third permutation that occurs in the forward portion of each of the mergers $M_n$ shown in FIG. 7.

In the recursive construction of the bitonic sorter $B_{n+1}$, a quantity $N=2^n$ wires are flipped. Specifically, as described in Section I, the outputs $z_{N+1}, z_{N+2} \ldots z_{2N}$ of the bitonic sorter $B_n^2$ are flipped before entering the bitonic merger $M_{n+1}$. The flips occur within a region F1 shown in FIG. 6. Moreover, a second permutation occurs as the signals $w_1, w_2 \ldots w_{2N}$ enter the bitonic merger $M_{n+1}$. The second permutation, also described in Section I, occurs within a region F2 shown in FIG. 7. Additionally, a third permutation occurs within each of the mergers $M_n^1$ and $M_n^2$ that are shown in FIG. 7. The third permutation is shown for the merger $M_n^1$ within a region F3, illustrated in FIG. 8. Note that for the above example, there are three permutations because n=3. More generally, there will be log N=n of such permutations.

The three permutations described above are shown together in FIG. 9. In a conventional implementation of Batcher's bitonic sorting network (from the point of view of grid column usage), those three permutations may be implemented, in series, as shown in FIG. 10. To simplify the illustration, the channel routing shown in FIG. 10 utilizes the aforedescribed aspect of the present invention wherein a single additional grid row is used for every four rows. A truly conventional implementation would presumably utilize an additional grid row for every two rows, per Pinter. The present analysis is directed, however, to grid column usage, which is unaffected by grid row usage. It can be seen that seventeen grid columns are used for channel routing the three permutations in a conventional layout.

Figure 9:
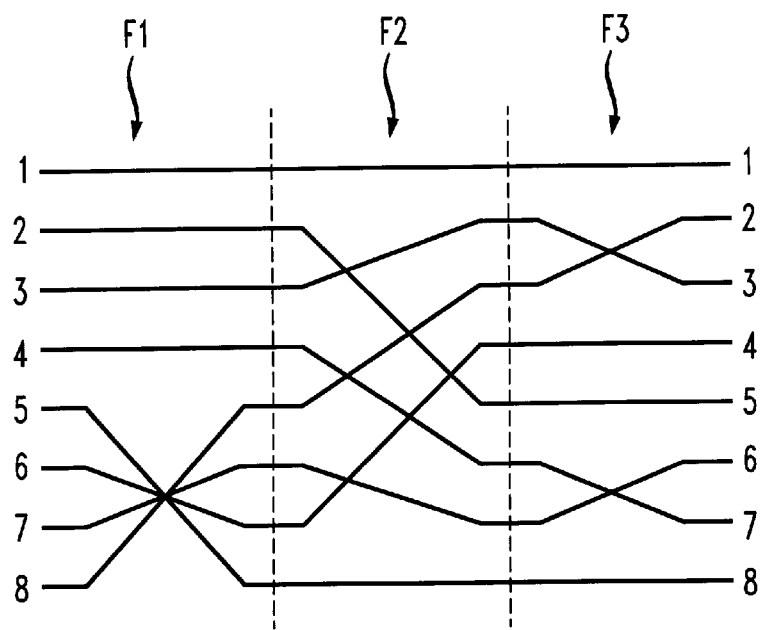
FIG. 9 shows the three permutations of FIGS. 6–8.
Figure 10:
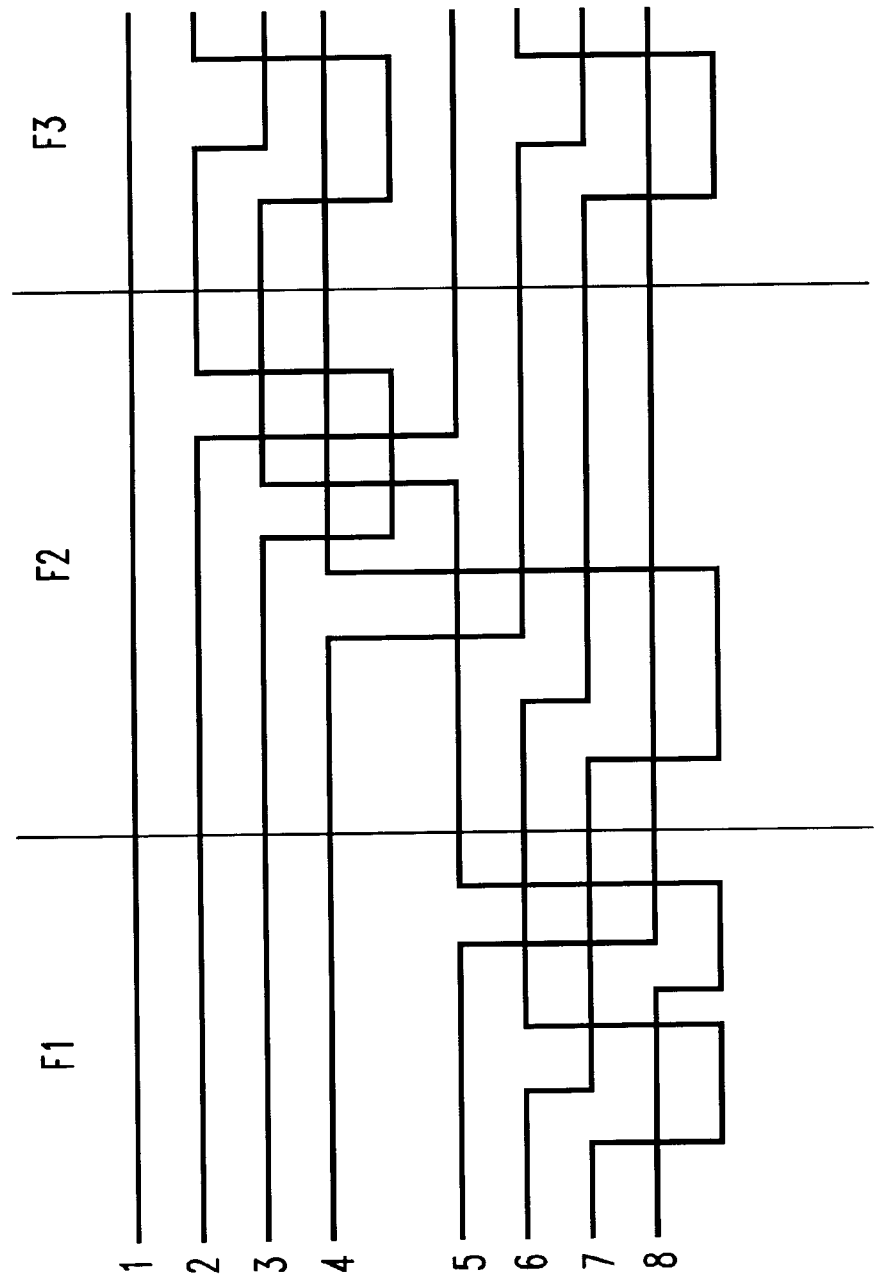
FIG. 10 shows a conventional channel routing of the three permutations of FIG. 9.
Figure 11:
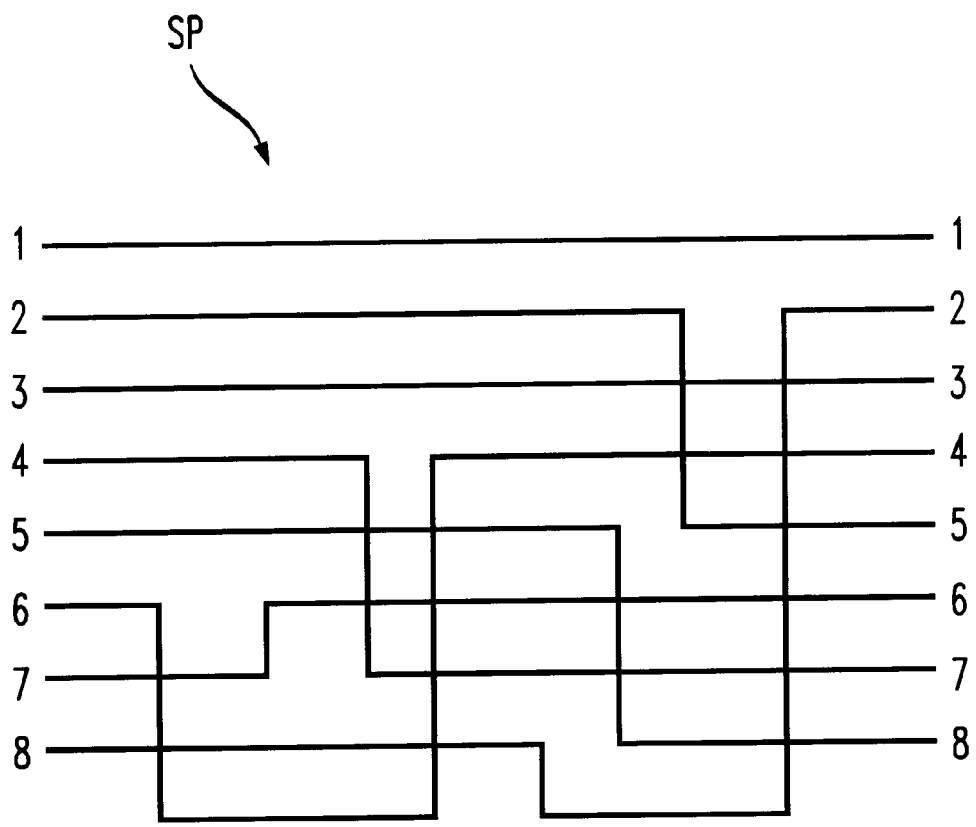
FIG. 11 shows an exemplary channel routing for a combined permutation according to the present invention.

The three permutations shown in FIG. 9 can be combined into a single permutation SP. The channel routing for such a combined permutation SP is shown in FIG. 11. In cyclic notation, the single permutation SP is expressed as (2,5,8) (4,7,6). Channel routing the single permutation SP according to the present invention requires only eight grid columns.

As previously noted, the same techniques can be applied to Batcher's "odd-even" network, with the result that the grid-area is bounded by $9.375N^2+o(N^2)$ grid units. See D. E. Knuth, previously cited, for a description of the odd-even network.

It will be appreciated that bitonic sorting network layouts requiring an area of less than $20.25N^2+o(N^2)$ grid units but more than $11.25N^2+o(N^2)$ grid units can be obtained. Several nonlimiting examples of such layouts include layouts wherein channel routing is performed using 3/2 N grid rows rather than 5/4 N grid rows, or layouts wherein less than n permutations are absorbed into the single combined permutation SP.

Batcher's sorting networks have been used in a variety of applications. As sorters, such networks find application to computing. Due to their structure, such networks are particularly useful in parallel computing applications for instruction and/or data routing to corresponding processors or memory cells used in such applications. Additionally, since such networks function as self-routing switching networks, they are useful in a variety of communications applications, such as, for example, broad band ISDN as well as in conventional data and/or telecommunications networks. See Weste and Eshraghian, *Principles of CMOS VLSI Design*, Section 9.4, (Addison Wesley, 1985). The improved layouts described herein may be used advantageously, in the same applications, to minimize the area required to physically implement the sorting network on one or more integrated circuits.

Figure 12:
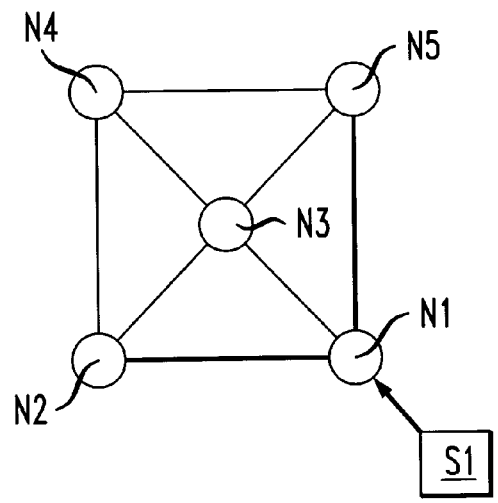
FIG. 12 shows a simplified diagram of a portion of an asynchronous transfer mode (ATM) network.

In the following nonlimiting example, improved layouts according to the present invention are used as the "switch fabric" of an asynchronous transfer mode (ATM) switch. FIG. 12 shows a portion of an ATM network having nodes N1–N5. In the example shown in FIG. 12, a single source S1 delivers data onto the network at N1 for delivery to other nodes in the network, such as nodes N2–N5. It should be appreciated that in other embodiments, such a network may receive data from multiple sources. Each of the nodes has an ATM node switch, not shown in FIG. 12, for routing data to other nodes in the network. A simplified diagram of an ATM node switch according to the present invention is shown in FIG. 13.

Figure 13:
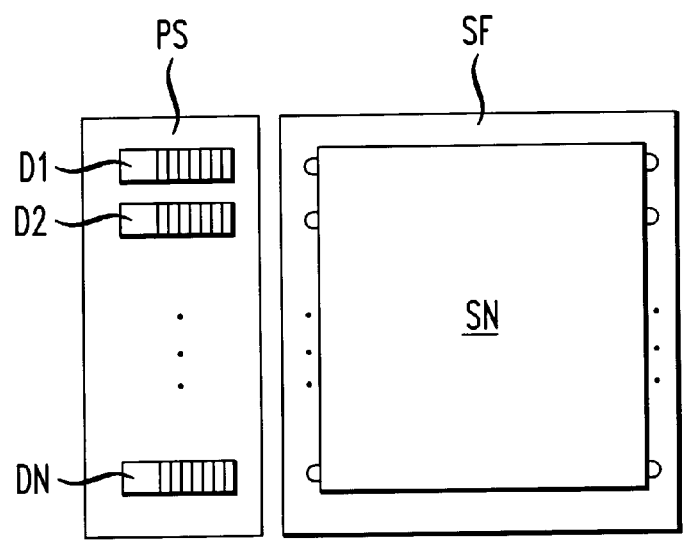
FIG. 13 shows a simplified diagram of an asynchronous transfer mode switch.

As shown in FIG. 13, data packets D1–DN are received by the ATM node switch and stored in buffers for preprocessing in preprocessing stage PS. In addition to information content, the data packets include routing or address data indicating the intended destination of the information content. In the preprocessing stage PS, decisions are made by known methods concerning the order of data flow into switch fabric SF, which is a sorting network SN having an improved layout as described herein. From the buffers, the data is delivered synchronously into the switch fabric SF, and routed to the appropriate node.

Although specific embodiments of this invention have been shown and described herein, it is to be understood that these embodiments are merely illustrative of the many possible specific arrangements that can be devised in application of the principles of the invention. Numerous and varied other arrangements can be devised in accordance with these principles by those of ordinary skill in the art without departing from the scope and spirit of the invention

I claim:

1. A sorting network $B_n$, comprising:
   network inputs for receiving a vector of $2^n$ input signals representing corresponding values;
   network outputs for providing $2^n$ sorted signals representing the $2^n$ input signals sorted according to their values;
   a plurality of comparison circuits, wherein:
   each said comparison circuit has two inputs and two outputs;
   each said comparison circuit has a network depth, said network depths having an order from minimum to maximum;
   said circuit plurality is arranged in grid columns by network depth;
   network inputs are connected to circuits having minimum network depth;
   the two outputs of each said comparison circuit are connected to the inputs of comparison circuits having greater network depth, if there are any;
   comparison circuits having maximum network depth are connected to the network outputs;
   the comparison circuits are arranged in functional groupings including sorters and mergers, wherein:
   said functional groupings are arranged in a manner defined by a recursive structure of the sorting network;
   mergers having comparison circuits of similar network depth are stacked in identical grid columns that include $¼(2^n)$ mergers of a kind that comprises four comparison circuits, said mergers to be referred to as $M_2$ mergers, and further wherein:
   each merger $M_2$ is laid out using five grid rows.

2. The sorting network of claim 1 wherein the sorting network is Batcher's bitonic network, and further wherein the sorting network is implemented in an area less than $20.25N^2+o(N^2)$ grid units for a network of N inputs, where $N=2^n$.

3. The sorting network of claim 1, wherein the recursive structure of the network is defined by the structure of $B_{n+1}$, wherein $B_{n+1}$ includes a first sorter $B_n^1$ and a second sorter $B_n^2$ each for receiving $2^n$ inputs and each generating $2^n$ sorted outputs, and a merger $M_{n+1}$ that receives $2 \cdot 2^n$ inputs from the first and second sorters and generates $2 \cdot 2^n$ sorted outputs, the merger $M_{n+1}$ comprising:

first and second mergers $M_n^1$ and $M_n^2$, and $2^n$ comparison circuits of equal network depth.

4. The sorting network of claim 3, and further comprising a fourth signal permutation that replaces first, second and third signal permutations wherein:

(i) said first signal permutation permutes said $2^n$ sorted outputs of the second sorter $B_n^2$;

(ii) said second signal permutation permutes at least some of said $2^n$ sorted outputs of the first sorter $B_n^1$ and at least some of said first signal permutation, which second signal permutation occurs after entering merger $M_{n+1}$ but before entering the first merger $M_n^1$ and the second merger $M_n^2$; and (iii) said third signal permutation permutes at least some of said second signal permutation after entering each of said first and second mergers.

5. The sorting network of claim 4 wherein the sorting network is Batcher's bitonic network, and further wherein the sorting network is implemented in an area less than $20.25N^2 + o(N^2)$ grid units for a network of N inputs, where $N = 2^n$.

6. The sorting network of claim 1 wherein the sorting network is Batcher's odd-even network, and further wherein the sorting network is implemented in an area less than $9.375N^2 + o(N^2)$ grid units for a network of N inputs, where $N = 2^n$.

7. A sorting network $B_{n+1}$, comprising:

Batcher's network for bitonic sorting including:

network inputs for receiving a vector of $2 \cdot 2^n$ input signals representing corresponding values;

network outputs for providing $2 \cdot 2^n$ sorted signals representing the $2 \cdot 2^n$ input signals sorted according to their values; and a plurality of comparison circuits that are arranged in functional groupings comprising:

a first sorter $B_n^1$ and a second sorter $B_n^2$ each for receiving $2^n$ inputs and each generating $2^n$ sorted outputs, and a merger $M_{n+1}$ that receives $2 \cdot 2^n$ inputs from said first and second sorters and generates $2 \cdot 2^n$ sorted outputs, the merger $M_{n+1}$ comprising:

first and second mergers $M_n^1$ and $M_n^2$; and $2^n$ comparison circuits; wherein, a fourth signal permutation replaces first, second and third signal permutations wherein:

said first signal permutation permutes said $2^n$ sorted outputs of the second sorter $B_n^2$;

said second signal permutation permutes at least some of said $2^n$ sorted outputs of the first sorter $B_n^1$ and at least some of said first signal permutation, which second signal permutation occurs after entering merger $M_{n+1}$ but before entering the first merger $M_n^1$ and the second merger $M_n^2$; and said third signal permutation permutes at least some of said second signal permutation after entering each of said first and second mergers.

8. A method for laying out a sorting network that is operable to receive, at network inputs, a vector of $2^n$ signals, the signals representing corresponding values, and to sort such signals providing $2^n$ sorted signals at network outputs, comprising:

arranging a plurality of comparison circuits in functional groupings on a grid of columns and rows, wherein:

each said comparison circuit has two inputs and two outputs, each said comparison circuit has a network depth, said network depths having an order from minimum to maximum, linking, via interconnections, the outputs of comparison circuits having a lesser network depth to the inputs of comparison circuits having a greater network depth according to a scheme of permutations; and channel routing said interconnections using five rows for every two comparison circuits stacked one above the other in columns.

9. The method of claim 8, wherein:

said functional groupings comprise sorters and mergers, and wherein the sorting network has a recursive structure defined by the structure of $B_{n+1}$;

$B_{n+1}$ including:

a first sorter $B_n^1$ and a second sorter $B_n^2$ each for receiving $2^n$ inputs and each generating $2^n$ sorted outputs, and a merger $M_{n+1}$ that receives $2 \cdot 2^n$ inputs from the first and second sorters and generates $2 \cdot 2^n$ sorted outputs, the merger $M_{n+1}$ comprising first and second mergers $M_n^1$ and $M_n^2$, and $2^n$ comparison circuits having equal network depth; and further comprising the step of:

forming a first combined permutation by combining a first permutation of interconnections that occurs after entering merger $M_{n+1}$ but before entering said first merger $M_n^1$ and said second merger $M_n^2$, with a second permutation of interconnections that occurs after entering each of said first and second mergers.

10. The method of claim 9, and further comprising the step of:

forming a second combined permutation by combining a third permutation of interconnections that occurs at the outputs of second sorter $B_n^2$ with the first combined permutation.

11. The method of claim 8, wherein:

said functional groupings comprise sorters and mergers, and wherein the sorting network has a recursive structure defined by the structure of $B_{n+1}$;

$B_{n+1}$ including:

a first sorter $B_n^1$ and a second sorter $B_n^2$ each for receiving $2^n$ inputs and each generating $2^n$ sorted outputs, and a merger $M_{n+1}$ that receives $2 \cdot 2^n$ inputs from the first and second sorters and generates $2 \cdot 2^n$ sorted outputs, the merger $M_{n+1}$ comprising first and second mergers $M_n^1$ and $M_n^2$, and $2^n$ comparison circuits having equal network depth; and further comprising the step of:

forming a first combined permutation by combining:

a first permutation of interconnections that occurs at the outputs of second sorter $B_n^2$ with at least one permutation selected from the group consisting of permutations of interconnections that occur:

after entering merger $M_{n+1}$ but before entering the first merger $M_n^1$ and the second merger $M_n^2$, and after entering each of the first and second mergers.

12. The method of claim 8 wherein the sorting network is Batcher's network for bitonic sorting.

13. The method of claim 8 wherein the sorting network is Batcher's network for odd-even sorting.

14. A switch for routing data signals to a network node, comprising:
- a preprocessing stage for receiving the data signals including address information, and for ordering data signal flow; and
- a switch fabric that receives the ordered data signals from the preprocessing stage, the switch fabric including a sorting network $B_n$ operable to route the data signals to an appropriate network node based on said address information of the signal, the sorting network comprising:
- network inputs for receiving a vector of $2^n$ input signals representing corresponding values;
- network outputs for providing $2^n$ sorted signals representing the $2^n$ input signals sorted according to their values;
- a plurality of comparison circuits, wherein:
  - each said comparison circuit has two inputs and two outputs;
  - each said comparison circuit has a network depth, said network depths having an order from minimum to maximum;
  - said circuit plurality is arranged in grid columns by network depth;
  - network inputs are connected to circuits having minimum network depth;
  - the two outputs of each said comparison circuit are connected to the inputs of comparison circuits having greater network depth, if there are any;
  - comparison circuits having maximum network depth are connected to the network outputs;
  - the comparison circuits are arranged in functional groupings including sorters and mergers, wherein:
    - said functional groupings are arranged in a manner defined by a recursive structure of the sorting network;
    - mergers having comparison circuits of similar network depth are stacked in identical grid columns that include $¼(2^n)$ mergers of a kind that comprises four comparison circuits, said mergers to be referred to as $M_2$ mergers, and further wherein:
  - each merger $M_2$ is laid out using five grid rows.

* * * * *